United States Patent
Finn et al.

[11] Patent Number: 6,021,657
[45] Date of Patent: Feb. 8, 2000

[54] METHOD AND APPARATUS FOR FORMING A WAVE CURB FOR MILKING PARLOR

[75] Inventors: Todd Weiss Finn, Holland Patent; Gale W. Burdick, Poland, both of N.Y.

[73] Assignee: Norbco, Inc., Westmoreland, N.Y.

[21] Appl. No.: 08/946,616

[22] Filed: Oct. 7, 1997

[51] Int. Cl.[7] .................................................. B21D 13/02
[52] U.S. Cl. .............................. 72/307; 72/385; 72/379.6
[58] Field of Search ..................... 72/307, 306, 217–219, 72/388, 387, 385, 379.6

[56] References Cited

U.S. PATENT DOCUMENTS

| | | |
|---|---|---|
| 1,591,509 | 7/1926 | Brookman . |
| 1,843,108 | 2/1932 | Clayden . |
| 2,821,809 | 2/1958 | Collier et al. ................................ 47/33 |
| 2,908,317 | 10/1959 | Sadler . |
| 3,777,527 | 12/1973 | Lohman ..................................... 72/217 |
| 3,828,733 | 8/1974 | Correia ................................. 119/14.03 |
| 3,875,786 | 4/1975 | Wright ..................................... 72/387 |
| 4,840,054 | 6/1989 | Sjogren ..................................... 72/385 |
| 5,156,108 | 10/1992 | Hawbaker ............................. 119/14.03 |
| 5,199,292 | 4/1993 | Del Fabro et al. ....................... 72/307 |

FOREIGN PATENT DOCUMENTS

| | | | |
|---|---|---|---|
| 50220 | 3/1982 | Japan ....................................... 72/385 |
| 163528 | 9/1983 | Japan ..................................... 72/379.6 |
| 1683838 | 10/1991 | U.S.S.R. .................................. 72/387 |
| 224789 | 11/1924 | United Kingdom ..................... 72/388 |

Primary Examiner—Daniel C. Crane
Attorney, Agent, or Firm—Trapani & Molldrem

[57] ABSTRACT

Wave curb for the cow stand of a diagonal or herringone milking parlor is formed of an elongated sheet metal strip. The side edges are each bent over about 180 degrees to form unitary beads on the side edges. The strip is bent in alternate curves in the longitudinal direction so as to form a succession of alternate arcuate bights, preferably with a wavelength of about 36 to 42 inches. Preferably, the strip is stainless steel or galvanized steel, and has a finished length of about 36 to 144 inches. The sheet metal workpiece is inserted into a wave curb bending apparatus which simultaneously forms a first pair of opposite arcuate bights. Then the workpiece is moved longitudinally in the wave curb bending apparatus; and a second pair of opposite arcuate bights is formed in the sheet metal workpiece. The forming of each pair of arcuate bights can be achieved by rotating a pair of oppositely directed drums against opposite sides of said strip, while holding the strips against a pair of rolls disposed beyond positions of the drums. One of the rolls can be removed for forming straight portions.

9 Claims, 4 Drawing Sheets

METHOD AND APPARATUS FOR FORMING
A WAVE CURB FOR MILKING PARLOR

BACKGROUND OF THE INVENTION

This invention relates in general to cattle stalls, e.g., milking parlors, and is more particularly directed to a curb for the cow stand of a herringbone or diagonal milking parlor. The invention is more particularly concerned with an improved wave curb that defines recesses between cow positions so that the milking operator can approach the cows from the side in a diagonal or herringbone parlor. The invention is further concerned with an improved method and machine for forming the wave curb.

A milking parlor generally consists of an array of individual stalls, each being designed to hold a single cow as she is being milked. The cows are walked into the parlor through an entry gate, and then each cow is directed to her respective stall. There an attendant washes her udders, attaches a milking unit, monitors and attends to the milking operation, disconnects the milking unit, and releases the cows so another group of cows can be milked. In parlors of this type, the cows typically proceed in single file through the entry gate into the parlor, and can exit, either in the same fashion through an exit gate at the far end, or in gang fashion out the side of the parlor.

There are various schemes for milking parlors, including herringbone, diagonal, and parallel or side-by-side. A parallel milking parlor operation is described in earlier U.S. Pat. Nos. 5,230,299 and 5,285,746. A diagonal style milking parlor is described in U.S. Pat. No. 5,638,768, granted Jun. 17, 1997, which relates to a relatively new design in milking parlors. The diagonal parlor is a hybrid of the parallel and herringbone configurations. These parlors place the cows at an angle of 50 to 70 degrees relative to the curb line. In a conventional herringbone parlor, the cow is at 30 degrees to no more than 45 degrees to the curb line, with a spacing of between 36 inches and 44 inches between cows along the curb line. By contrast, the parallel or side-by-side parlor places the cows at 90 degrees, and at a spacing of 27 inches to 29 inches along the curb line, but requires the cows to be milked between their hind legs. In the hybrid diagonal design, the cows are placed at a typical angle of 50 to 60 degrees, with a spacing between cows of 30 inches. It is possible to achieve a steeper angle of 70 degrees and a spacing of only 27 inches along the curb. Another example of a diagonal parlor design is the ParaBone® parlor, sold by Germania Dairy Automation, Inc.

Sequencing gates, which are required in parallel or side-by-side parlors, can be omitted in the diagonal parlor.

In either case, the cows are to be backed up to a curb at the back or operator side of the cow stand. The operator then approaches each of the cows in turn, washes and disinfects her udders, and attaches the associated milking machine. As aforementioned, the operator has access to the cows' udders from the side, and just ahead of their rear legs. On the other hand, the cows are angled away from the operator, so it would be advantageous to provide some means at the curb line between cow positions for improved access. Ideally, this can be accomplished by using curbing that is wavy or scalloped, rather than the straight or linear curbing now in common use.

There have been several attempts to construct wave curb for milking parlors. Typically this has involved bending a straight length of sheet steel into a series of curves or bights, and then embedding this into the concrete material of the cow stand when constructing it. After installing it, a bead of metal or other material is attached onto the top edge. Unfortunately, because the bent metal strip is not very rigid, it is difficult to handle and install. The strip tends to flex when being handled, and so it does not keep an exact shape or dimension. In addition, no machine or apparatus has been available for forming the waves or bights in the metal, and these are usually formed by bending the strip around a drum type form, then flipping the sheet over and bending it in the other direction on the form. This is repeated until the strip is a series of alternate curves. This is clearly a very slow and labor intensive process, and the wave curb strip that it yields is not uniform or consistent from one to the next.

In addition, because the beads are attached afterwards, and not formed unitarily with the metal curbing, there is a tendency for them to detach over time from the curb.

OBJECTS AND SUMMARY OF THE INVENTION

Accordingly, it is an object of this invention to provide a wave curb for a diagonal mining parlor which overcomes the drawbacks of the prior art.

It is another object to provide a wave curb to be used in a diagonal milking parlor in which the cattle are oriented at an angle of up to about 70 degrees, which defines a rear position for the rear legs of the cows, yet which facilitates milking the cows from the side.

It is a further object to provide a wave curb that is durable, simple to handle and install when the cow stand is formed, and which can be installed either on a left or right cow stand without modification of the wave curb.

It is a still further object to provide a method or process of forming this wave curb with an integral bead, which can be preferably formed on both side edges.

It is a yet further object to provide a machine or apparatus which facilitates the construction of uniform, durable lengths of wave curbing for milking parlors.

In accordance with an aspect of the present invention, a wave curb is constructed for the cow stand of a milking parlor in which cows stand alongside one another. The wave curb is formed of an elongated sheet metal strip having a longitudinal direction and a transverse direction, and having transversely opposite side edges. The side edges are each bent over about 180 degrees to form beads on opposite side edges which are unitary with a central portion that is unbent in the transverse direction. The strip is bent in alternate curves in the longitudinal direction so as to form a succession of alternate arcuate bights. In order to achieve the objectives of this invention, the wave curb can have a wavelength of about 36 to 42 inches. The beads are favorably bent to the same side of said central portion so that the wave curb has a C-shaped section. Preferably, the strip is stainless steel or galvanized steel, and has a finished length of about 36 to 144 inches, and favorably 108 to 136 inches.

The metal wave curb is formed from a flat sheet metal strip that has a longitudinal direction and a transverse direction and having transversely opposite edges that extend in the longitudinal direction, the method of forming the wave curb involves bending the metal strip, at each edge, to form respective edge bends of at least 90 degrees; forcing the edge bends flat to form opposed unitary beads which are bent over at least about 180 degrees with respect to the strip, thus creating a flat sheet metal workpiece with opposite unitary beads on its side edges; simultaneously forming in a curve bending apparatus, a first pair of opposite arcuate bights having curve axes in the transverse direction of the sheet metal strip; moving the strip longitudinally in the curve bending apparatus; and simultaneously forming a second pair of opposite arcuate bights in the sheet metal strip. The forming of each pair of arcuate bights can include rotating a pair of oppositely directed drums against opposite sides of said strip, while holding the strip against a pair of rolls disposed beyond positions of the drums.

The machine for forming the wave curb can comprise a frame; a pair of press members each having a cylindrical surface for pressing an arcuate wave bight into a length or strip of sheet metal; a rotor pivotally mounted on the frame and having a rotation axis, e.g., vertical in the disclosed example. The cylindrical press members are mounted on the rotor on radially opposite sides of the rotation axis. The press members have their cylindrical axes disposed parallel to the rotation axis, and have their cylindrical surfaces facing oppositely. A hydraulic ram or other linear or rotary machine urges the rotor and the press members to travel rotationally about the rotation axis from an open position (i.e., out of engagement with the length of sheet metal) to a closed position (i.e., where the press members are pressed into the sheet metal to bend the same) to form the alternate curves. A pair of rolls are disposed on the frame in parallel with the rotation axis at respective positions radially beyond the travel of the press members. In a preferred embodiment, the press machine press members are adjustably mounted on the rotor, and the radial spacing between them can be selected or adjusted between at least first and second radial distances. That is, the two press members can be moved between an 18 inch spacing and a 21 inch spacing to form the wave curb with either a 36 inch or 42 inch wavelength. There can be other intermediate settings, if desired. One or both of the rolls can include release means permitting the roll to be temporarily removed from said frame. This permits forming of wave curb with a straight section, if desired. The machine also has a work table on which the straight workpiece is rested and fed in between the press members. This work table can have indexes marked on it, so that an operator can move the workpiece from an initial mark, where the first pair of curves is formed, to a second mark, where the next pair of curves is formed, to a third mark, where a third pair of curves is formed, and so on. The machine is capable of forming wave curb from the sheet metal strip after the beads are formed on its two side edges.

The above and many other objects, features, and advantages of this invention will become apparent from the ensuing detailed description of a preferred embodiment, which should be read in connection with the accompanying Drawing.

DETAILED DESCRIPTION OF THE PREFERRED EMBODIMENT

Figure 1:
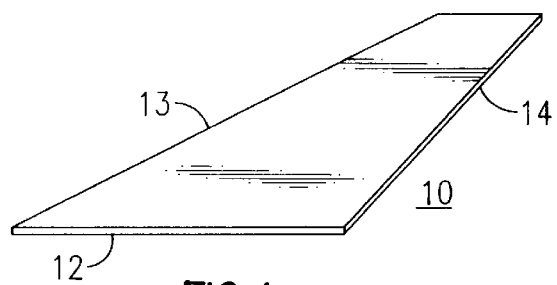
FIG. 1 is a perspective view of a flat strip of sheet metal for forming the wave curb of this invention.
Figure 2:
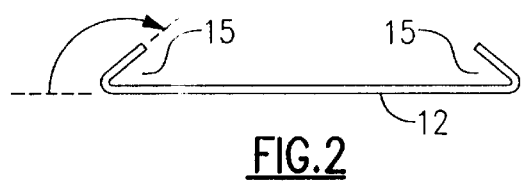
FIGS. 2 and 3 are end views showing the progressive formation of the edge beads of the wave curb of this embodiment.
Figure 3:

With reference now to the Drawing, and initially to FIGS. 1 to 4, a section 10 of wave curbing for the cow stand of a milking parlor is made from an elongated, rectangular length 12 of sheet metal, e.g. a stainless steel. The curbing 10 is to be disposed adjacent a milking pit, which is the work station for the milker or operator. As shown in FIG. 1, the flat 12 of sheet metal has opposite side edges 13, 14 that extend in the longitudinal direction. The flat 12 is placed in a bending brake, and the edges 13, 14 are folded over for an angle 15 of somewhat in excess of 90 degrees (FIG. 2). Then each edge is flattened, e.g., using a flattening bar in the brake, for form flattened edge beads 16 (FIG. 3). The edge beads 16 are preferably formed both on the same side of the central portion 17, and unitary therewith, so that the profile is somewhat C-shaped. At this point, the central portion 17 is still flat, and this portion remains unbent in the transverse direction, i.e., across in FIG. 3 or vertical in FIG. 4. The edge beads serve to rigidize the sheet metal, and also present a smooth edge to the curbing 10 for both the cows and for the milling operator.

Figure 4:
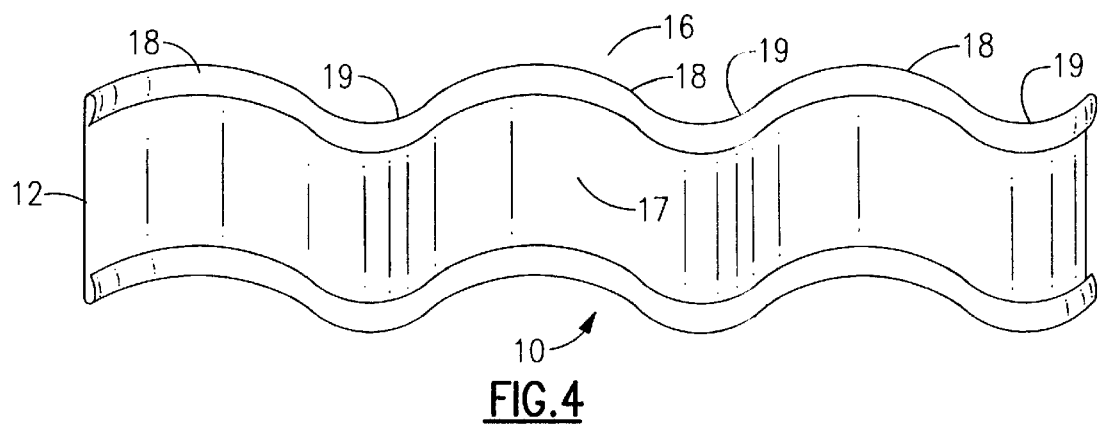
FIG. 4. is a perspective view of wave curb according to this embodiment.
Figure 5:
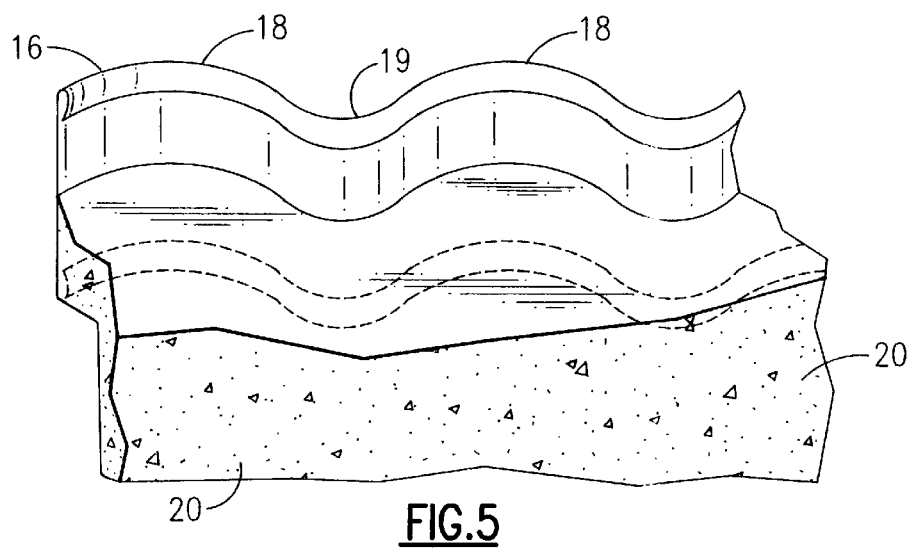
FIG. 5 is a perspective view showing a portion of a concrete cow stand in which the wave curb of this embodiment is embedded.

The edged sheet metal flat is then fed through a wave curb machine, to be described shortly, to form alternate arcuate bights, with each pair of bights including a first arcuate bight 18, that loops out (i.e. into the page in FIG. 4) and a second arcuate bight 19 that curves in the opposite sense (i.e., out towards the viewer in FIG. 4). The finished curbing is later embedded into the concrete 20 of a cow stand 21, as illustrated in FIG. 5. Here, recesses can be formed in the poured concrete 20 to conform with the positions of the alternate bights 19, to facilitate the operator approaching the cows' adders from the side when the cow is backed against the curbing 10. As is apparent here, the curbing is invertible, and can be installed on the opposite side cow stand simply by placing the curbing with the edge 13 instead of edge 14 oriented upwards.

Figure 6:
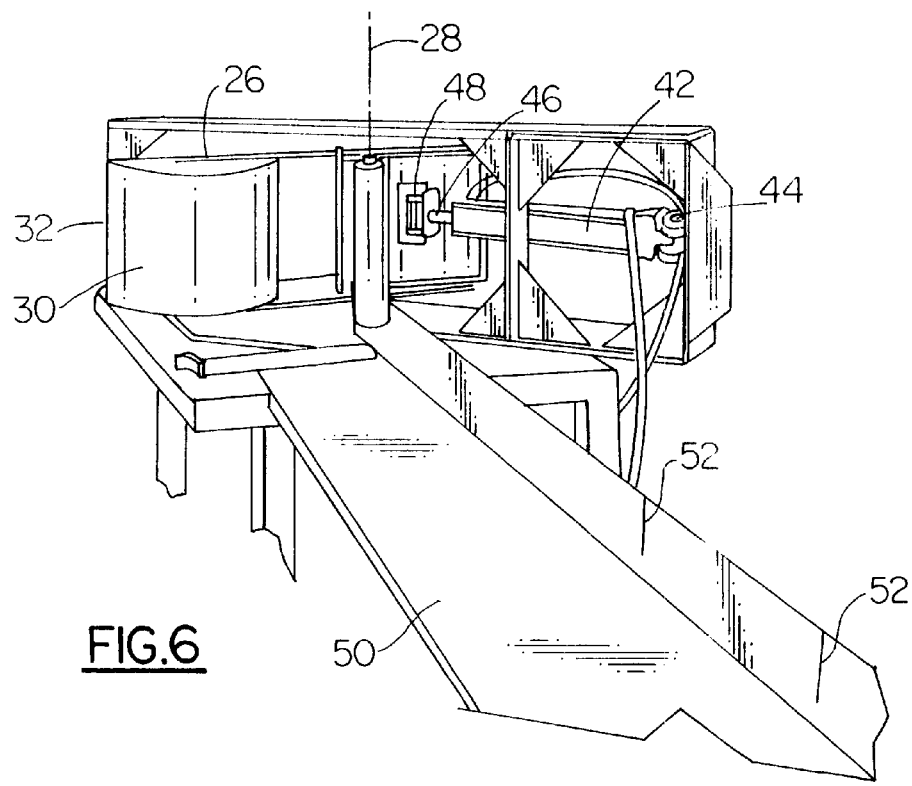
FIGS. 6, 7 and 8 are perspective views of a wave curb machine according to an embodiment of this invention.
Figure 7:
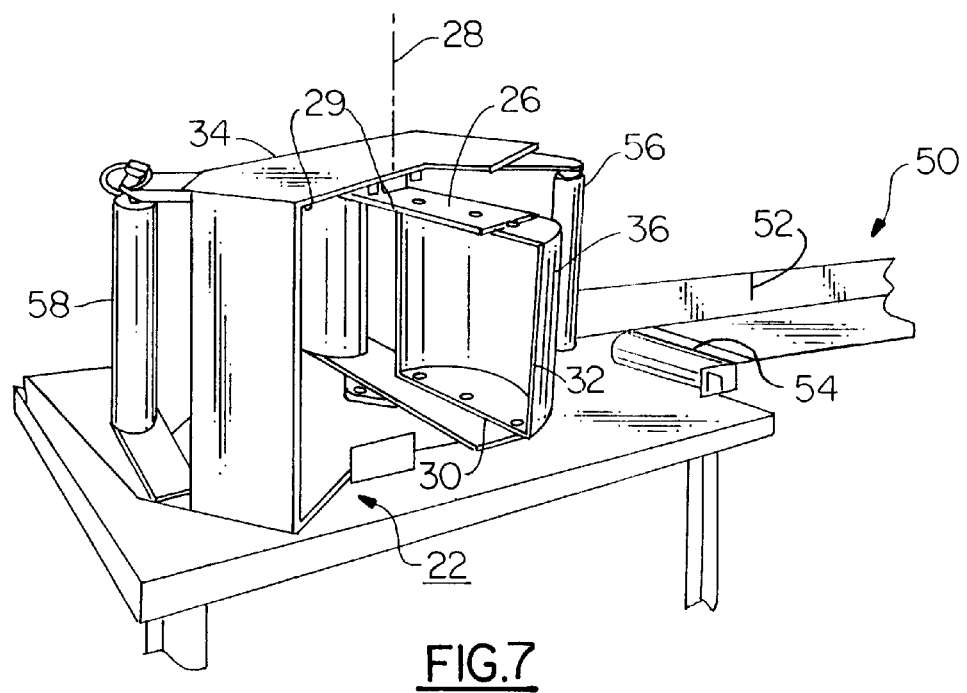

An embodiment of the wave curb making apparatus of this invention, or wave curb machine 22, is shown in FIGS. 5, 6, and 7.

The wave curb machine 22 has a frame 24 with upper and lower members that hold a rotor 26 that pivots on pivot members about a vertical axis 28. The rotor is formed of an upper bar 29 and a lower bar 30 on which are mounted a first half drum member 32 and a second half drum member 34. The half drum members 32, 34 have respective cylindrical surfaces 36, 38 that face in transversely opposite directions, that is in the same rotational direction about the axis 28. A hydraulic ram 40 has its cylinder 42 mounted on a vertical portion 44 of the frame 24 and has its rod 46 connected to a mount 48 associated with one of the half drum members, in this embodiment with the second half drum member 34. The ram 40 rotates the rotor 26 between an open position, in which the flat workpiece can be inserted between the half drum members 32, 34, and a closed position in which the half drum members 32, 34 impress a wave shape into the workpiece. This will be described shortly in respect to FIGS. 9A to 9E.

Disposed at an entry side of the frame 24 is an elongated feed table 50 for resting the workpiece, i.e., the flat 12 of sheet metal on which the beaded edges 16 have been formed. The table 50 is provided with index markings 52 at predetermined points along its length to facilitate placing of the workpiece to form successive pairs of alternate bights 18, 19. At a distal end of the table 50 in advance of the rotor is a horizontal feed roller 54, after which is positioned a first or feed side vertical roller 56. The position of this roller is just in advance of the position of the first half drum 32 when the rotor 26 is in its closed position. Just beyond the position of the second half drum 34 (in the closed position), at an exit side, is a second vertical roller or exit side vertical roller 58.

Figure 8:
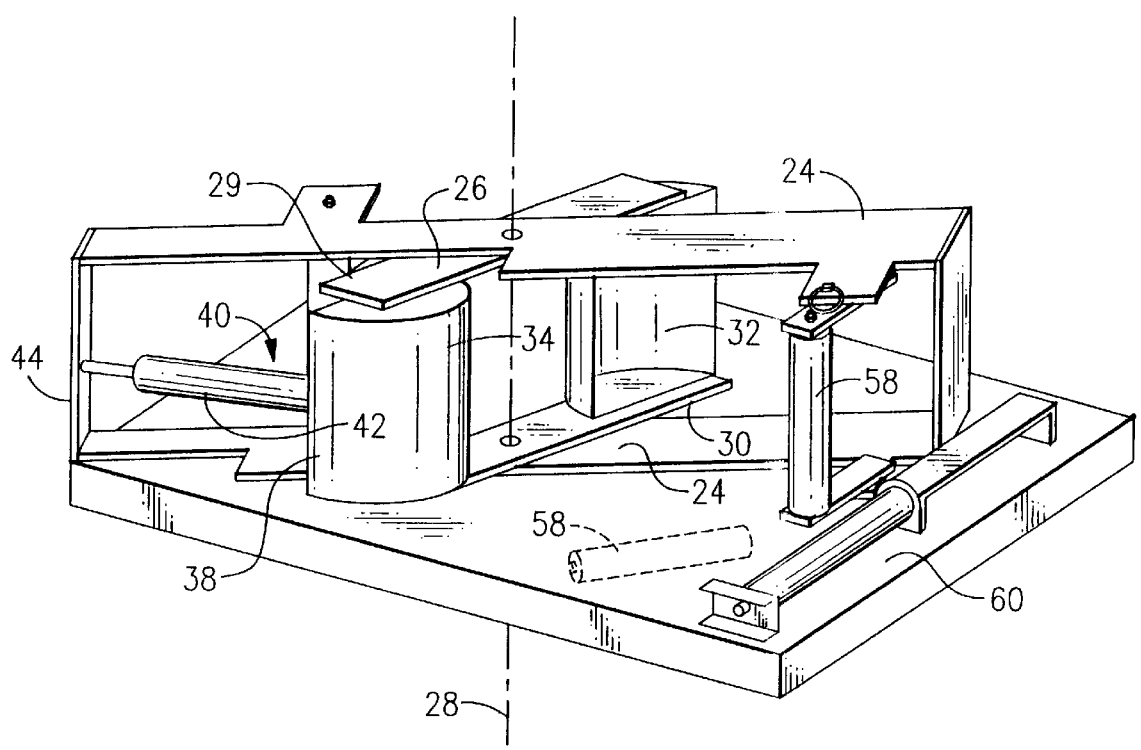

There is an exit side horizontal roller 60 just beyond the position of the vertical roller 58. As shown in ghost in FIG. 8, the exit side vertical roller 58 can be removed temporarily from the frame 24 for purposes of forming a straight section on the wave curb, i.e., for portions of the cow stands near the associated exit gate and entrance gate.

Figure 9A:
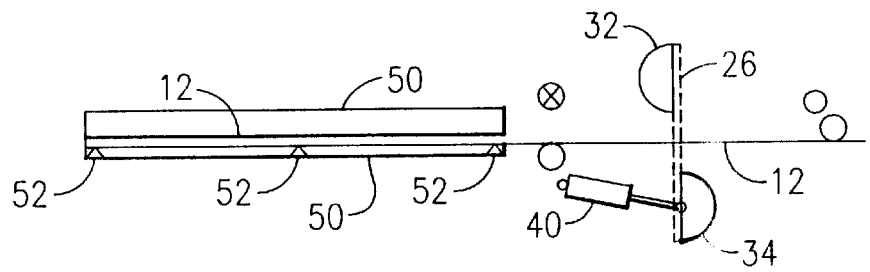
FIGS. 9A to 9E are schematic diagrams showing the process of forming the wave curb of this invention.
Figure 9B:
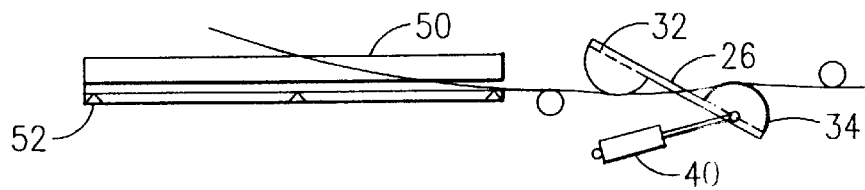
Figure 9C:
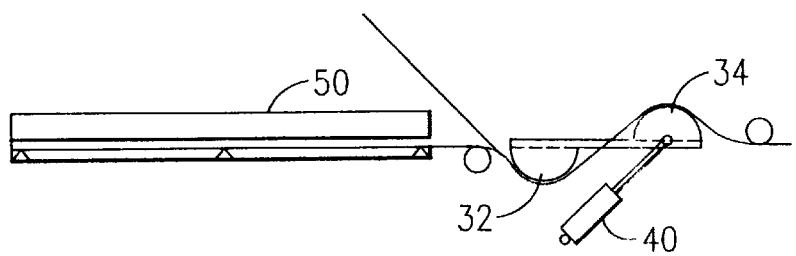
Figure 9D:
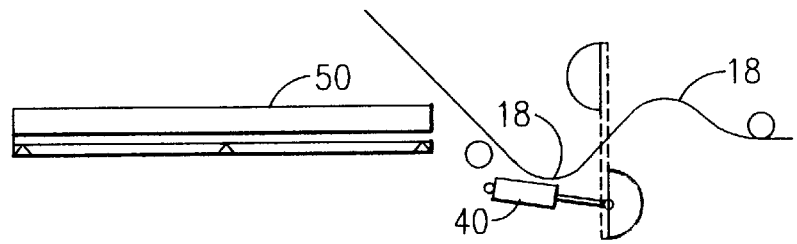
Figure 9E:
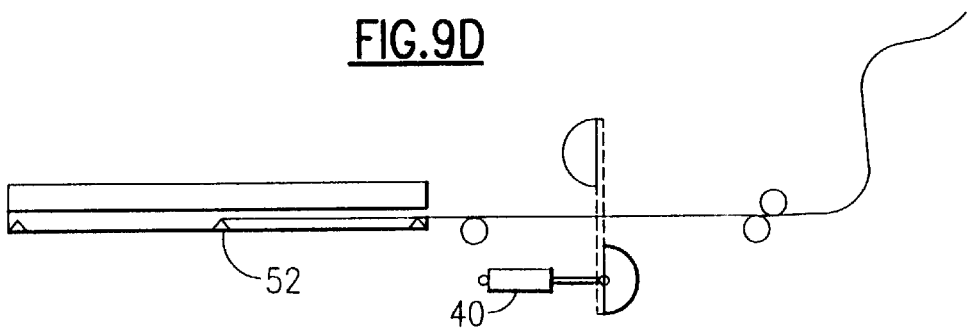

The operation of the wave curb machine can be understood from a consideration of the schematic view of FIGS. 9A to 9E, in which the same reference numbers used in earlier figures identify the same elements. Initially, with the rotor 26 in the open position (FIG. 9A), the workpiece or flat 12 is placed onto the feed table 50 and fed into the wave curb machine between the two half drums 32, 34 and also between the two vertical rollers 56, 58. The flat 12 is fed in until the back or proximal end of the flat 12 aligns with the first one of the index marks 52. Then the ram 40 is actuated to rotate the rotor 26 and the half drums 32 and 34, as shown in FIG. 9B. The half drums contact the distal portion of the flat 12 at opposite sides. The rotor continues to turn until the half drums 32 and 34 have moved fully to the closed position (FIG. 9C) in which the half drums have impressed or molded the opposed successive half bights 18 and 19 into the workpiece. Then the ram 40 is actuated to withdraw the rotor 26 from the closed back to the open position, as shown in FIG. 9D. Because the metal material of the workpiece (e.g., stainless steel) retains some resilience after this step, the alternate bights 18, 19 spring back away from the half drums, and facilitate release of the workpiece from the rotor. Also, this gives the bights 18 and 19 a somewhat larger radius than the cylindrical surfaces 36, 38 of the half drums. Now, with the rotor 26 in the open position, the workpiece is moved along the table 50 to align with the next one of the index marks 52, as shown in FIG. 9E. With the workpiece in this position, the steps shown in FIGS. 9A to 9D are repeated to form a second successive pair of alternate bights 18, 19. The workpiece is positioned a third time, and the process is repeated to form a third set of arcuate bights, and so on, until the section of wave curbing is complete.

As mentioned above, the half drums can be connected at different positions along the upper and lower bars 29 and 30 of the rotor to create wave curbing of different predetermined wavelengths. For example, at a wide setting, the wave curb machine can produce wave curbing with a wavelength of 42 inches, and with a narrow setting, wave curbing with a wavelength of 36 inches. Intermediate settings are possible, as are greater or smaller dimensions, as required for a given end use. The half drums can be bolted in place on the rotor, with additional bolt holes being provided on the rotor for each position. Also, instead of a hydraulic ram, a pneumatic or electric actuator or motor can be employed. Also, while it is preferred to form the wave curbing with the edge beads bent to the same side, as shown here, it is possible to form curbing with the edge curbing with the edge beads bent to opposite sides, with a generally S-shaped section instead of a generally C-shaped sections.

The invention has been described herein with reference to a single preferred embodiment, but the invention is not limited to that embodiment. Rather, many modifications and variations will become apparent to persons skilled in the art without departing from the scope and spirit of this invention, as defined in the appended claims.

I claim:

1. Method of forming a metal wave curb for a cow stand of a milking parlor, from a flat sheet metal strip that has a longitudinal direction and a transverse direction and having transversely opposite edges that extend in the longitudinal direction, wherein the strip is bent in alternate curves in the longitudinal direction so as to form a succession of alternate arcuate bights; the method comprising:

bending the metal strip, at each edge, to form respective edge bends of at least 90 degrees, with both edges being bent to the same side;

forcing the edge bends flat to form opposed unitary beads which are bent over at least about 180 degrees with respect to said strip, thus creating a flat sheet metal workpiece with opposite unitary beads on its side edges;

simultaneously forming, in a curve bending apparatus, a first pair of opposite arcuate bights having curve axes in the transverse direction of said sheet metal strip;

moving the strip longitudinally in said curve bending apparatus; and simultaneously forming a second pair of opposite arcuate bights in said sheet metal strip.

2. Method of forming a metal wave curb for a cow stand of a milking parlor, from a flat sheet metal strip that has a longitudinal direction and a transverse direction and having transversely opposite edges that extend in the longitudinal direction, the method comprising:

bending the metal strip, at each edge, to form respective edge bends of at least 90 degrees;

forcing the edge bends flat to form opposed unitary beads which are bent over at least about 180 degrees with respect to said strip, thus creating a flat sheet metal workpiece with opposite unitary beads on its side edges;

simultaneously forming, in a curve bending apparatus, a first pair of opposite arcuate bights having curve axes in the transverse direction of said sheet metal strip;

moving the strip longitudinally in said curve bending apparatus; and simultaneously forming a second pair of opposite arcuate bights in said sheet metal strip, wherein said forming each pair of arcuate bights includes rotating a pair of oppositely directed drums against opposite sides of said strip.

3. The method of claim 2 wherein said step of forming arcuate bights also includes holding said strips against a pair of rolls disposed beyond positions of said drums.

4. Wave press machine for forming sheet metal wave curb from a length of sheet metal having a longitudinal direction and a transverse direction, comprising:

a frame;

a pair of press members each having a cylindrical surface for pressing an arcuate wave bight into said length of sheet metal;

a rotor pivotally mounted on said frame and having a rotation axis, said press members being mounted on said rotor on radially opposite sides of said rotation axis, said press members having cylindrical axes disposed parallel to said rotation axis, and with their cylindrical surfaces facing oppositely, such that said press members form a pair of joined opposite arcuate bights in said length of sheet metal;

means for urging said rotor and said press members to travel rotationally about said rotation axis from an open position out of engagement with said length of sheet metal to a closed position in which said press members are pressed into said length of sheet metal to bend same; and a pair of rolls disposed on said frame parallel to said rotation axis at respective positions radially beyond said press members.

5. Wave press machine according to claim 4 wherein said press members are adjustably mounted on said rotor so that the radial spacing between them can be selected between at least first and second radial distances.

6. Wave press machine according to claim 4 wherein at least one of said rolls includes means permitting same to be temporarily removed from said frame.

7. Wave press machine according to claim 4 wherein said means for urging said rotor to travel rotationally includes a hydraulic ram having a cylinder mounted on one of said frame and said rotor and a rod mounted on the other thereof.

8. Wave press machine according to claim 4 wherein said rotor travels about ninety degrees between said open and said closed positions.

9. Wave press machine for forming sheet metal wave curb from a length of sheet metal having a longitudinal direction and a transverse direction, comprising:

a frame;

a pair of press members each having a cylindrical surface for pressing an arcuate wave bight into said length of sheet metal, wherein said press members are in the form of half-drums;

a rotor pivotally mounted on said frame and having a rotation axis, said press members being mounted on said rotor on radially opposite sides of said rotation axis said press members having cylindrical axes disposed parallel to said rotation axis, and with their cylindrical surfaces facing oppositely;

means for urging said rotor and said press members to travel rotationally about said rotation axis from an open position out of engagement with said length of sheet metal to a closed position in which said press members are pressed into said length of sheet metal to bend same; and a pair of rolls disposed on said frame parallel to said rotation axis at respective positions radially beyond said press members.

\* \* \* \* \*

UNITED STATES PATENT AND TRADEMARK OFFICE
CERTIFICATE OF CORRECTION

PATENT NO. : 6,021,657

DATED : Feb. 8, 2000

INVENTOR(S) : Todd W. Finn et al.

It is certified that error appears in the above-identified patent and that said Letters Patent is hereby corrected as shown below:

Col 2, line 20:

"mining" should read --milking--

Col. 4, line 29:

"adders" should read --udders--

Signed and Sealed this

Seventh Day of November, 2000

Attest:

Q. TODD DICKINSON

*Attesting Officer*  *Director of Patents and Trademarks*